Patented July 25, 1933

1,919,580

UNITED STATES PATENT OFFICE

HERMANN WAGNER, OF BAD SODEN-ON-THE-TAUNUS, AND HERBERT KRACKER, OF FRANKFORT-ON-THE-MAIN, GERMANY, ASSIGNORS TO GENERAL ANILINE WORKS, INC., OF NEW YORK, N. Y., A CORPORATION OF DELAWARE

NEW 1.4-DIALKOXY-BENZENE COMPOUNDS

No Drawing. Application filed October 10, 1930, Serial No. 487,898, and in Germany December 11, 1928.

The present invention relates to the new compounds of the following general formula:

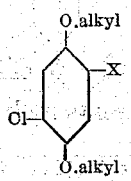

wherein X represents hydrogen, a nitro or an amino group.

These compounds are obtainable, for instance, as follows:

A 1-amino-2.5-dialkoxy-benzene may be diazotized and the diazo group exchanged for a chloro group according to the well-known method of Sandmeyer. In this way the 1-chloro-2.5-dialkoxy-benzenes are obtainable.

When starting from a 1-amino-2.5-dialkoxy-4-nitrobenzene the chloro-2.5-dialkoxy-4-nitro- or -4-amino-benzenes are obtainable by exchanging in the starting materials the amino group according to Sandmeyer by the chloro group and when preparing the 4-amino compounds subjecting the 1-chloro-2.5-dialkoxy-4-nitro-benzenes thus obtainable to a reducing process.

The 1-chloro-2.5-dialkoxy-benzenes are in general fluid compounds, possessing a weakly yellowish-green coloration. 1-chloro-2.5-dimethoxybenzene, for instance, boils at 124° C.–126° C. under a pressure of 17–18 mm.

The 1-chloro-2.5-dialkoxy-4-nitrobenzenes are in the dry state solid compounds, possessing a yellow coloration. 1-chloro-2.5-dimethoxy-4-nitrobenzene, for instance, forms when recrystallized from alcohol lemon-yellow needles melting at 144° C.–145° C.

The 1-chloro-2.5 dialkoxy -4- amino-benzenes are in the dry state solid compounds.

1-chloro-2.5-dimethoxy-4-amino-benzene, for instance, forms when recrystallized from alcohol white needles melting at 118° C.–119° C.

The following examples illustrate the invention, but they are not intended to limit it thereto:

(1) 153 grams of 1-amino-2.5-dimethoxy-benzene obtainable, for instance, according to Annalen 207, pages 253 and 254, are dissolved in 300 ccm. of hydrochloric acid of 20° Bé. and 1000 ccm. of water and the whole is diazotized by means of 71 grams of sodium nitrite at a temperature of 5° C. The clear diazo solution is run into a solution of 80° C. containing 100 grams of cuprous chloride and 500 ccm. of hydrochloric acid of 20° Bé. When frothing has ceased, the 1-chloro-2.5-dimethoxybenzene thus formed is expelled by means of steam. It forms a feebly yellow oil boiling under a reduced pressure of 17–18 mm. at a temperature of from 124° C.–126° C.

By using instead of 1-amino-2.5-dimethoxybenzene other dialkylethers of aminohydroquinone, there are obtainable the corresponding chloro-hydroquinonedialkylethers.

(2) 198 grams of 1-amino-4-nitro-2.5-dimethoxybenzene obtainable, for instance, according to D.R.P. 141 975 or according to Berichte 17, 2121 and D.R.P. 141 398 are stirred with 300 ccm. of hydrochloric acid of 20° Bé. and water and the whole is diazotized while adding ice. The diazo solution which, if necessary, may be filtered by suction is run at a temperature of 80° C. into a solution of 100 grams of cuprous chloride and 500 ccm. of hydrochloric acid of 20° Bé. When frothing has ceased the 1-chloro-4-nitro-2.5-dimethoxy-benzene which has separated is filtered by suction. It forms when recrystallized from alcohol lemon-yellow needles melting at 144–145° C.

By using instead of 1-amino-4-nitro-2.5-dimethoxybenzene other dialkylethers of 1-amino-4-nitro-2.5-dihydroxy-benzene, there are obtainable according to the process above described the corresponding 1-chloro-4-nitro-2.5-dialkoxy-benzenes.

(3) 200 grams of 1-choloro-4-nitro-2.5-dimethoxy-benzene obtainable according to Example 2 are reduced at a temperature of from 90° to 100° C. by means of 200 grams of iron turnings, 2 liters of water and 25 ccm. of hydrochloric acid of 20° Bé. The reduction mass is rendered alkaline by means of sodium carbonate, the ferruginous mud is filtered by suction and dried. The base thus obtained is extracted by means of alcohol. By evaporating the alcohol, the base crystallizes in the form of brownish needles, and after being re-dissolved once more from alcohol, the 1-chloro-4-amino-2.5-dimethoxy-benzene is obtained in the form of white needles melting at 118° C.-119° C.

By using instead of 1-chloro-4-nitro-2.5-dimethoxy-benzene other dialkylethers, there are obtainable the corresponding amino dirivatives.

We claim:

1. As new products the compounds of the following general formula

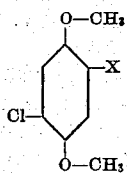

wherein X represents hydrogen, a nitro or an amino group.

2. As a new product 1-chloro-2.5-dimethoxy-benzene forming a feebly yellow oil boiling under a reduced pressure of 17-18 mm. at a temperature of from 124° C.-126° C.

3. As a new product 1-chloro-2.5-dimethoxy-4-nitro-benzene forming when recrystallized from alcohol lemon-yellow needles melting at 144° C.-145° C.

4. As a new product 1-chloro-2.5-dimethoxy-4-amino-benzene forming white needles melting at 118° C.-119° C.

5. As new products, the compounds of the following general formula:

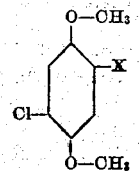

wherein X represents hydrogen or an amino group.

HERMANN WAGNER.
HERBERT KRACKER.